Sept. 6, 1949.    H. M. McCOY    2,480,871
VARIABLE PITCH PROPELLER
Filed April 9, 1945
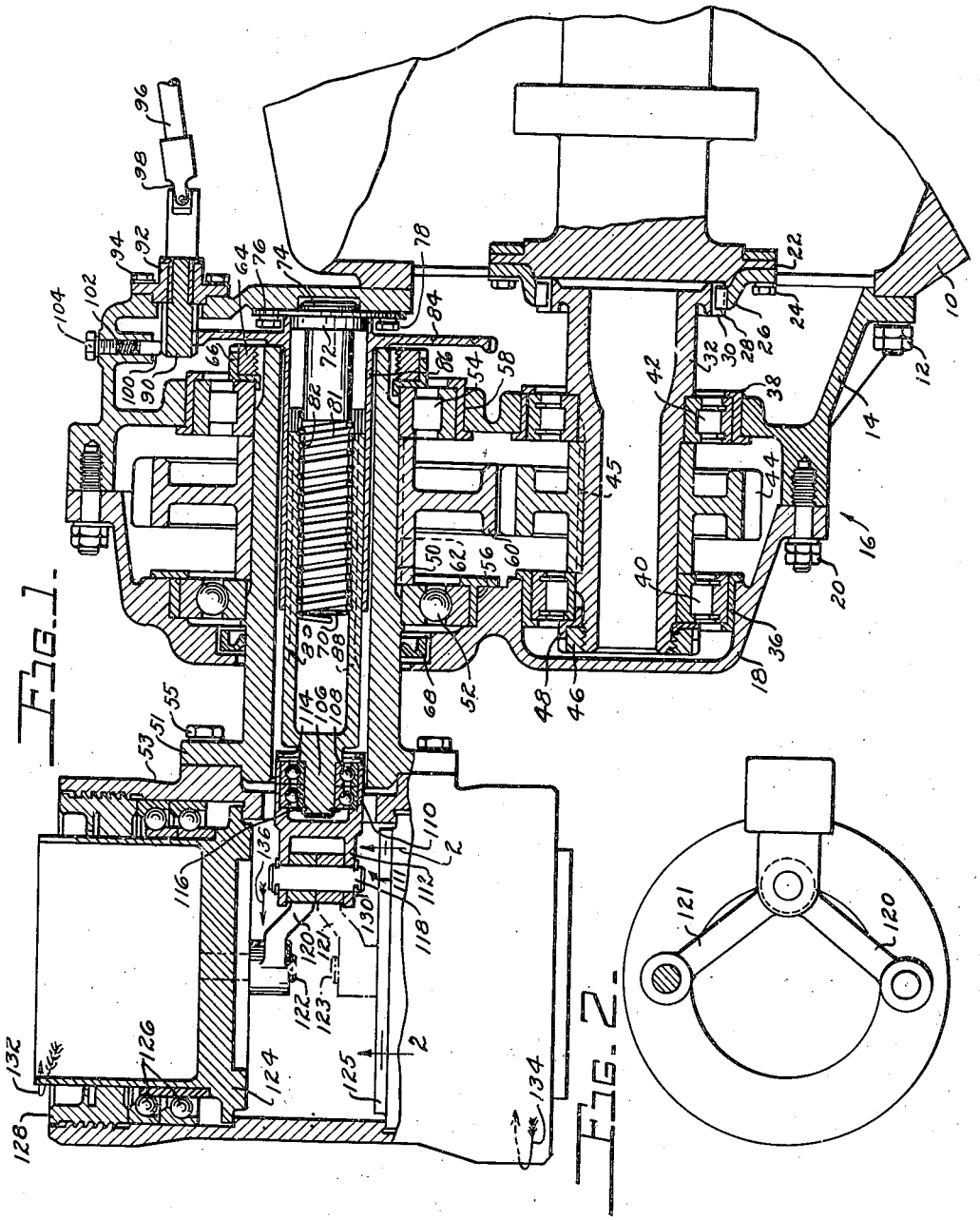
INVENTOR.
HOWARD M. McCOY
BY
ATTORNEYS Patented Sept. 6, 1949

2,480,871

UNITED STATES PATENT OFFICE 2,480,871

VARIABLE PITCH PROPELLER

Howard M. McCoy, Elmira, N. Y.

Application April 9, 1945, Serial No. 587,419

4 Claims. (Cl. 170—135.75)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a pitch changing mechanism for aircraft propellers, being particularly applicable where the propeller shaft is axially parallel to the engine shaft and connected thereto by gearing.

In a propeller installation of this kind, the bearings employed for supporting the propeller shaft, and the gears for drivably connecting the shaft to the engine, are necessarily quite large and heavy, and therefore require considerable space in an axial direction, so that, if the pitch changing mechanism is to be placed on the outside of the propeller shaft, forward of the gears as in current practice, much more overhang of the propeller hub will result.

It is therefore an object of this invention to provide a pitch changing mechanism which may be contained within a hollow propeller shaft which is substantially no longer than is required to hold the bearings and the gearing which are carried on the outside thereof.

Another object is to so construct and arrange the various parts of the mechanism that they may be contained in a relatively small compact housing, whereby much overall space is conserved and lubrication of the several parts becomes a simple problem.

Other objects and advantages will become evident as the invention is further described with reference to the drawing, wherein:

Fig. 1 is a vertical axial section through the propeller, showing the drive gearing, the pitch change mechanism and the pitch control unit.

Fig. 2 is a view of a detail part of the device taken at 2—2 of Fig. 1.

Like reference characters refer to like parts throughout the drawings.

Secured to the nose of an aircraft engine 10 by nuts 12 is the rear half 14 of a split housing 16, the front half 18 being secured by nuts 20 to the rear half, thereby making an oil tight enclosure.

Attached to the front flange 22 of the engine crank shaft by screws 24 is an adapter 26 which has internal splines 28 into which the external splines 30 of a crankshaft extension 32 fit slidably.

Bearing liners 36 and 38, press fitted into hubs in the housing 16 receive the outer races of roller bearings 40 and 42 respectively, the inner races being spaced apart on the crankshaft extension 32 by the hub of a driving gear 44, the hub being provided with internal splines which fit slidably over external splines 45 on the crankshaft extension 32. The inner races of the bearings and the hub of the gear are clamped together and to a shoulder on the shaft 32 by a nut 46. A lock washer 48 locks the nut in position. The interior of the housing 16 is in communication with the interior of the engine crankcase whereby the lubricating system of the engine serves also as a means to lubricate the operating parts within the gear housing.

Axially spaced apart from the crankshaft extension 32 and within the gear housing 16 is a hollow propeller shaft 50, this shaft being rotatably supported in the housing by antifriction bearings 52 and 54 which are respectively carried in bearing liners 56 and 58, the liners being press fitted into hubs in the housing.

Bearings 52 and 54 are spaced apart on the shaft 50 by the hub of a driven gear 60, the hub being provided with internal splines which fit slidably over external splines 62 on the hollow propeller shaft 50. The inner races of the bearings and the hub are clamped together and to a shoulder on the shaft 50 by a nut 64. A lock washer 66 locks the nut in position. An oil seal 68 is provided where the hollow shaft 50 extends through the front of the housing. A flange 51 on the forward end of the shaft 50 supports the propeller hub 53. Screws 55 attach the hub to the flange. The flange 51 may preferably be of such dimensions as will fit a standard rigid blade propeller hub if it becomes desirable to substitute a rigid propeller hub for that shown.

Coaxially disposed within the hollow propeller shaft 50 is a pitch changing screw 70 which, at its rearward end, has an integral collar 72, pilot portion 74, and flange 76. Screws 78 extend through the flange to nonrotatably secure it to the housing 16. The pilot portion 74 maintains concentric relation between the pitch changing screw 70 with the hollow propeller shaft 50.

Concentrically surrounding the pitch changing screw 70 is a tubular pitch changing nut 80 which may be provided with any convenient form of internal threads fitted freely over corresponding external threads in the screw, whereby rotation of the pitch changing nut will move it axially on the screw.

In order, however, that movement of the nut 80 over the screw 70 will be accomplished with minimum friction, a special form of thread is provided. This thread consists of helically extending grooves 81 of arcuate cross section, one on the outside of the screw and another on the inside of the nut, the grooves being such that a series of balls 82 fit freely but not too freely in the space between the grooves.

As a means of rotating the pitch changing nut 80 on the pitch changing screw 70 to move it axially thereon, a gear 84 is provided. Gear 84 has a long integral sleeve 86 which has internal splines which fit the external splines 88 on the pitch changing nut 80.

An elongated pinion 90 has rotative bearing in a flanged hub 92 which is held on the housing 16 by screws 94. A control shaft 96 extending from the cockpit is connected by universal joint 98 to the pinion 90. A detent plunger 100 is held in contact with the teeth of the pinion 90 by a spring 102, the reaction of which is taken by a screw 104 to prevent too free rotation, whereby vibration of the mechanism might result in an unwanted pitch change. The control shaft 96 may be operated manually, or automatically, in response to an off-speed condition of the engine, as desired.

The forward end of the tubular pitch change nut 80 is closed and provided with a forwardly projecting part 106 to which the inner races of the antifriction bearings 108 are fitted, the outer races of the bearings being fitted to a cup 110 which has a pair of hinge ears 112 extending from its forward end. A spring ring 114 prevents the bearings 108 being withdrawn from the cup. A spring ring 116 prevents the inner races of the bearings being drawn from the projecting part 106. A wrist pin 118 is supported in openings in the ears 112. The bearings 108, cup 110, and ears 112 may collectively be referred to as the wrist pin swivel 111.

Hinged between the ears 112 by the wrist pin 118 are the rear ends of two connecting rods 120 and 121, the forward ends being fitted to crank pins 122 and 123 which extend from the ends of the ferrules 124 and 125 into which the shanks of wooden propeller blades (not shown) are fitted, or, if metal blades are used the shanks may have a configuration corresponding to the parts 124 and 125. The ferrules or shanks 124 and 125 are rotatable in bearings 126 held in place by a nut 128. The wrist pin 118 is held in place by the spring rings 130. Possible movement of the pitch changing nut and associated parts is such that the propeller blades may be operated from +90 degrees for feathering to −30 degrees for propeller braking.

The operation of the mechanism is substantially as follows:

Assume that the propeller is overspeeding so that it is desirable to increase the pitch by rotating the ferrules or shanks 124 and 125 in the direction of the arrows 132 and 134. This will be accomplished by turning the control shaft 96 anticlockwise viewed from the pilot's seat, whereby the tubular pitch changing nut 80 will be turned on the right-hand thread of the screw 70, which will move the nut toward the left in the drawing, carrying the wrist pin 118 and connecting rods 120 and 121 with it in the direction of the arrow 136, the cup 110, which carries the outer races of the bearings 108 rotating at propeller speed and the projection 106 which carries the inner races of the bearings rotating only so fast as it may be turned by the control shaft 96. Clockwise rotation of the control shaft 96 will decrease the pitch by turning the ferrules or shanks 124 and 125 oppositely of the arrows 132 and 134.

The embodiment shown and described discloses a right-hand propeller and left-hand engine, but all that is required when using a left-hand propeller with a right-hand engine is to position the crank pins 122 and 123 in the ferrules or shanks diametrically opposite the positions shown.

That the arrangement shown has many additional advantages will be obvious. Both the gearing and the pitch change mechanism are completely enclosed in the short nose end housing, being thus contained in a minimum axial space and being lubricated by the same oil and oiling means as the engine. If the pitch change mechanism were placed on the outside of the propeller shaft, as is current practice, it would have to be placed forward of the front propeller shaft bearing, which would add greatly to the overhang of the propeller hub.

The single piece hub design is also noted. Such a hub is not only easy to machine but may be made lighter in weight because of its single piece construction. Because of the crank pin and connecting rod arrangement the interfacing ends of the ferrule are much closer together than in general practice, thus bringing the blade airfoil sections inward toward the axis of the propeller shaft, thereby affording better cooling in some situations and cutting down blade shank drag in any installation.

While in the embodiment shown and described I have employed and positioned within the hollow countershaft, a screw and nut mechanism for causing the axial movement which operates the pitch change mechanism within the propeller hub, it is to be understood that any mechanism which may be enclosed in the hollow countershaft and be contained substantially within the length of the hollow hub will be considered within the spirit of the invention.

I claim:

1. A combined pitch changing mechanism and speed reducing gearing for the propeller of an aircraft engine, which comprises, in combination, a housing attached to the nose of said engine, a crankshaft extension in said housing, means drivably connecting said extension to said crankshaft, spaced apart bearings on said extension supported in said housing, a driving gear fast on said extension between said bearings, a hollow propeller shaft in said housing having its axis parallel to said extension axis, spaced apart bearings on said propeller shaft supported in said housing, a driven gear fast on said hollow propeller shaft between said propeller shaft bearings, the forward end of said propeller shaft extending through the front end of said housing and having a flange thereon, a one-piece propeller hub drivably attached to the flange of said propeller shaft, propeller shank ferrules rotatably supported in said hub on axes normal to the propeller shaft axis, crank pins carried on the interfacing ends of said ferrules within said one-piece propeller hub, and a pitch change mechanism wholly within said hollow propeller shaft and said one piece propeller hub which comprises a cantilever mounted pitch change screw coaxial with said propeller shaft secured to the rear wall of said housing, against both rotative and axial movement and extending forwardly within the hollow of said propeller shaft, an externally splined tubular pitch change nut on said screw extending forwardly within the propeller shaft, a swivel member freely rotatable on the forward end of said nut within said one-piece hub, a wrist pin, means on said swivel member for supporting said wrist pin between the inner ends of said ferrules with its axis transverse to the propeller shaft axis, a pair of connecting rods connecting said wrist pin to said crank pins, an internally splined sleeve surrounding said nut within said hollow propeller shaft for receiving said externally splined nut slidably, a pitch change gear on said sleeve, means to prevent said sleeve moving axially, and means to rotate said pitch change gear whereby said nut is moved axially.

2. A combined pitch changing mechanism and speed reducing gearing for the propeller of an aircraft engine, which comprises, in combination, a housing attached to the nose of said engine, a crankshaft extension in said housing, bearing means on said extension supported in said housing, a driving gear fast on said extension, a hollow propeller shaft in said housing having its axis parallel to said extension axis, spaced apart bearings on said propeller shaft supported in said housing, a driven gear fast on said hollow propeller shaft between said propeller shaft bearings, the forward end of said propeller shaft extending through the front end of said housing and having a flange thereon, a one-piece propeller hub drivably attached to the flange of said propeller shaft, propeller blade shank holding means rotatably supported in said hub on axes normal to the propeller shaft axis, crank pins carried on the interfacing ends of said blade shank holding means within said one-piece propeller hub, and a pitch change mechanism wholly within said hollow propeller shaft and said one piece propeller hub which comprises a pitch change screw secured to the rear wall of said housing against both rotation and axial movement and extending forwardly within the hollow of said propeller shaft, an externally splined tubular pitch change nut on said screw extending forwardly within the propeller shaft to a point near said hub, a wrist pin between the inner ends of said shank holding means with axis transverse to the propeller shaft axis, a wrist pin swivel on the forward end of the pitch change nut having means for supporting the wrist pin, a pair of connecting rods between the inner ends of said shank holding means connecting said wrist pin to said crank pins, an internally splined sleeve within the hollow of said propeller shaft for receiving said externally splined nut slidably, a pitch change gear on said sleeve, means to prevent said sleeve moving axially, and means to rotate said pitch change gear.

3. The combination of a pitch changing mechanism and speed reducing gearing for the propeller of an aircraft engine, which comprises a housing attached to the nose of said engine, a crankshaft extension in said housing, a driving gear fast on said extension, a hollow propeller shaft in said housing with its axis parallel to said extension axis, spaced bearing means for said propeller shaft in said housing, a driven gear fast on said hollow propeller shaft in mesh with said driving gear, the forward end of said propeller shaft extending through the front end of said housing, a propeller hub drivably attached to the extending end of said propeller shaft, propeller blade shanks rotatably supported by said hub on axes normal to the propeller shaft axis, blade rotating means on the interfacing ends of said blade shanks within said propeller hub, and a pitch change mechanism wholly within said hollow propeller shaft and said propeller hub which comprises a pitch change screw having its rearward end secured to the rear wall of said housing against both rotation and axial movement and extending forwardly within the hollow of said propeller shaft, an externally splined tubular pitch change nut on said screw extending forwardly within the propeller shaft, swivel means within the propeller shaft on the forward end of said nut at the juncture between said shaft and said hub, means on said swivel means between the inner ends of said blade shanks connected to said blade rotating means whereby axial movement of said nut rotates said blades, an internally splined sleeve for receiving said externally splined nut slidably, a pitch change gear on said sleeve, means to prevent said sleeve moving axially, and means to rotate said sleeve and said pitch change gear.

4. The combination of a pitch changing mechanism and speed changing gearing for the propeller of an aircraft engine, which comprises a housing attached to the nose of said engine, a driving shaft in said housing, a driving gear fast on said driving shaft, a hollow propeller shaft in said housing having its axis parallel to the axis of said driving shaft, bearings on said hollow propeller shaft supported in said housing, a driven gear fast on said hollow propeller shaft in mesh with said driving gear, the forward end of said propeller shaft extending through the front end of said housing, a propeller hub carried on the forward end of said propeller shaft, propeller blade shanks rotatably supported by said hub on axes normal to the propeller shaft axis, blade rotating means within said propeller hub on the inner ends of said shanks, and a pitch change mechanism wholly within said propeller shaft and said propeller hub which comprises a pitch change screw having one end rigidly secured to the rear wall of said housing and extending forwardly within said propeller shaft, a pitch change nut on said screw extending forwardly within the propeller shaft, a swivel on the forward end of said nut between the interfacing ends of said shanks, means connecting said swivel to said blade rotating means, whereby axial movement of said swivel operates said blade rotating means, and means to rotate said nut on said screw to move said nut axially.

HOWARD M. McCOY.

REFERENCES CITED

The following references are of record in the file of this patent:

UNITED STATES PATENTS

| Number | Name | Date |
| --- | --- | --- |
| 1,879,659 | Coolidge | Sept. 27, 1932 |
| 1,942,100 | Houston | Jan. 2, 1934 |

FOREIGN PATENTS

| Number | Country | Date |
| --- | --- | --- |
| 305,700 | Germany | June 15, 1917 |
| 329,210 | Italy | Sept. 3, 1935 |

OTHER REFERENCES

Application No. 302,870, (A. P. C.) published May 18, 1943.